J. ACTON.
COMBINED STOP AND CHECK VALVE.
APPLICATION FILED JULY 1, 1909.
1,195,429.
Patented Aug. 22, 1916.
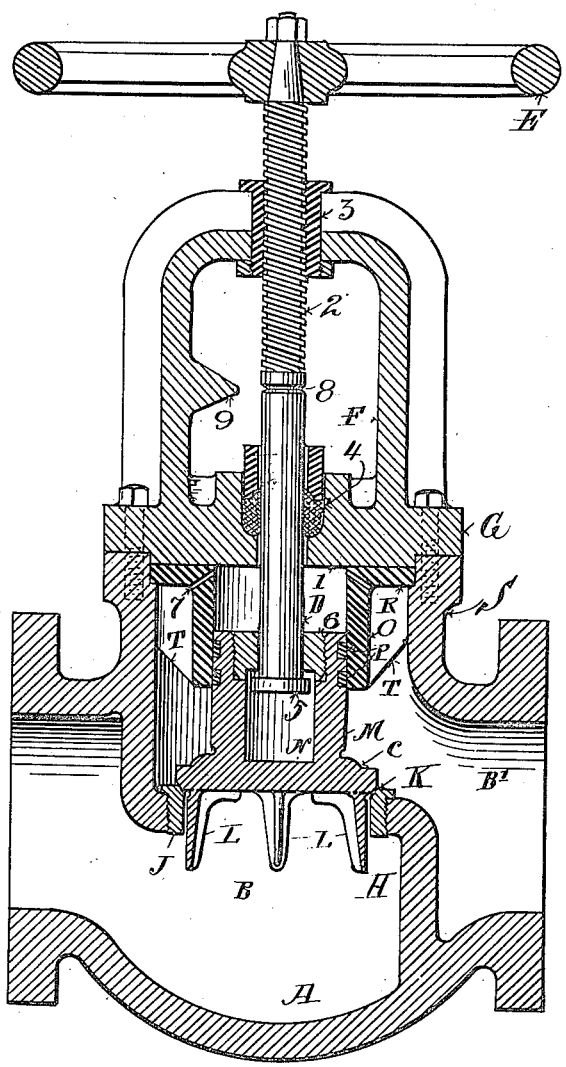

UNITED STATES PATENT OFFICE.

JOHN ACTON, OF NEW YORK, N. Y.

COMBINED STOP AND CHECK VALVE.

1,195,429.                    Specification of Letters Patent.      Patented Aug. 22, 1916.

Application filed July 1, 1909. Serial No. 505,319.

*To all whom it may concern:*

Be it known that I, JOHN ACTON, a citizen of the United States, residing at New York, county of Kings, State of New York, have made a certain new and useful Invention in Combined Stop and Check Valves, of which the following is a specification.

This invention relates to stop and check valves.

The object of the invention is to provide a stop and check valve which is simple in construction and efficient in operation.

A further object is to provide a valve construction of the nature referred to wherein the valve may be operated manually to open and to close, but where, when desired, the seating and unseating movements of the valve may be effected automatically by variations in pressure.

Other objects of the invention will appear more fully hereinafter.

The invention consists substantially in the construction, combination, location and arrangement of parts, all as will be more fully hereinafter set forth, as shown in the accompanying drawing and finally pointed out in the appended claims.

The single view of the drawing is a central longitudinal section of a valve embodying the principles of my invention.

In the construction and operation of valves it is desirable to provide means whereby the valve may be operated manually to open and close and which may, when desired, be also operated automatically by variations in pressure.

It is among the special purposes of my present invention to provide a construction which is simple and economical to manufacture, and efficient in operation, and wherein these desirable objects are attained.

In the drawing, wherein is shown a construction embodying the principles of my invention, reference sign A, designates the valve casing; B, B', the chambers; C, the valve; D, a valve rod; E, a hand wheel or other device for operating the valve; F, the yoke in which the valve rod D is mounted, and G, the cap or cover for the valve casing.

The casing is provided on the interior thereof with a ring shaped diaphragm portion H, separating the chambers B, B', and which if desired, may be interiorly threaded to receive an exteriorly threaded bushing J which is provided with a beveled edge surface K, forming a seat with which coöperates a correspondingly beveled surface on the lower edge of the valve C. The valve may be provided with the extensions L, which extend through and bear against the interior surface of the bushing J, thereby forming guides, for centering the valve and guiding it in its movements.

The valve C, has formed integrally therewith a cylindrical portion M, having an interior chamber N. The cylindrical portion M, of the valve, works in a cylindrical sleeve O, mounted within the valve casing, the cylindrical portion M, of the valve having exteriorly applied packing rings P, which, working within the sleeve O, form a tight joint between these parts. The sleeve O is provided with a circular flange R, which fits within the portion S, of the casing and is thereby centered and supported in position. Webs T, formed on the exterior of the sleeve O fit against the interior surface of the portion S, of the casing to aid in centering the sleeve therein, while at the same time offsetting the body portion of the sleeve so as to provide a space around the exterior of said sleeve, and between the same and the inner wall of the portion S, of the casing.

The yoke F is formed with the cap G, the latter having a flange to enable the same to be bolted upon the end surface of the portion S, of the casing. If desired, and preferably, the under surface of the cap is provided with an extended portion 1, which closely fits within the portion S, of the casing whereby the cap may be efficiently and quickly assembled in place and in centered relation.

The hand wheel or other operating device E, is mounted on the end of the valve rod D, which extends through the yoke F, the rod being provided with a threaded portion 2, working through a threaded bushing 3, in the yoke, whereby, by turning the handle or wheel E, the valve stem or rod D, may be shifted or moved endwise.

The valve stem or rod D, works through a stuffing box 4, formed centrally in the cap G, and its inner end extends freely into the chamber N of the cylindrical portion M, of the valve, and is provided with a head or shoulder 5. A flanged collar 6, screwed into the end of the cylindrical portion M, of the valve serves to retain the headed end of the valve stem within the chamber N.

A duct or passage 7 is formed through the wall of sleeve O, from the valve chamber B', into the interior of the sleeve and hence, into the chamber N.

The operation of the device is as follows: When it is desired to operate the valve manually the hand wheel or other device E is rotated, thereby moving the headed end 5 of the valve rod or stem in one direction or the other until the bottom of chamber N, is engaged thereby, when moved in one direction, or the collar 6, is engaged when said head is moved in the other direction, thereby either seating or unseating the valve as the case may be, and holds the same locked in seated or unseated position. The chamber N should be of sufficient length to permit a considerable range of relative travel of the valve and the stem or rod, so that by suitably setting the headed end of the stem in proper position, as, for instance, in the position shown in the drawing, the valve is enabled to seat or to unseat automatically and independently of any movement of the stem. If desired the position of the stem which permits the automatic movement of the valve may be marked or indicated in any suitable or convenient manner. For accomplishing this purpose I have shown the stem provided with a groove or mark 8, which, when brought opposite a pointer 9, or other indicating device carried by the yoke F, will indicate that the headed end of the stem is in such position as to permit the valve to seat or unseat automatically.

In the automatic operation of the valve the valve will seat or remain seated if the pressure in the chamber B' is in excess of that in chamber B, for, in such case the pressure medium in chamber B', reaching the interior of sleeve O, through duct 7, and thence to the interior of chamber N, operates upon a slightly greater area of the valve than that against which the pressure in chamber B operates, with the result that when the pressure in chamber B' is equal to or exceeds that in chamber B, the valve will seat and remain seated, but when the pressure in chamber B' falls below that in chamber B, the valve will unseat automatically. The pressure in the sleeve O having a restricted exit through duct 7, forms a cushion in this instance thereby preventing the valve from striking too hard against the cap or bonnet G.

From the foregoing description and the accompanying drawing, it will be seen that I provide an exceedingly simple construction of combined manually and automatically operated valve, with few parts which can be economically manufactured and quickly and easily assembled and centered in assembled relation.

Having now set forth the object and nature of my invention and a construction embodying the principles thereof, and having described such construction, its objects, purposes and mode of operation, I desire it to be understood that my invention as defined in the claims is not to be limited or restricted to the exact details of construction and arrangement shown and described. But

What I claim as new and useful and of my own invention and desire to secure by Letters Patent is:

1. The combination with a casing having chambers, a flanged sleeve centered in the casing, webs formed on the exterior of said sleeve and fitting around the interior surface of the casing, a valve seat disposed between the chambers, a valve having a cylindrical portion, the said cylindrical portion having packing rings fastened thereupon and forming therewith a piston, the said piston operating in said sleeve the interior of which communicates with one of said chambers, a cap for the casing, a stem operating through said cap and having a headed end extending into the cylindrical piston to permit relative movements of the valve and stem.

2. The combination with a casing having chambers, a seat disposed between said chambers, a valve coöperating with said seat, a cap for the casing, said cap having an extended under surface fitted into and centered by the casing, a valve stem, a yoke carried by the cap and through which the stem works, lost motion connection between the stem and valve whereby the valve may be operated manually by the stem or automatically independently of the stem, means for cushioning the automatic movement of the valve and indicating means on the stem for indicating the position of the stem to permit the automatic action of the valve.

In testimony whereof I have hereunto set my hand in the presence of the subscribing witnesses, on this 18th day of June, A. D. 1909.

JOHN ACTON.

Witnesses:
CLARENCE HUNICKE,
J. E. KLEIN.